United States Patent [19]

Tomasi

[11] Patent Number: 4,668,954
[45] Date of Patent: May 26, 1987

[54] AIRCRAFT POSITION DETERMINING SYSTEM

[75] Inventor: Jean-Pierre Tomasi, Les Molieres, France

[73] Assignee: U.S. Philips Corporation, New York, N.Y.

[21] Appl. No.: 737,017

[22] Filed: May 23, 1985

[30] Foreign Application Priority Data

May 29, 1984 [FR] France .................. 84 08390

[51] Int. Cl.⁴ .................................. G01S 1/24
[52] U.S. Cl. .................... 342/387; 342/462; 342/46
[58] Field of Search ............. 343/5 LS, 5 GC, 6.8 R; 342/46, 33, 34, 36, 38, 387, 462

[56] References Cited

U.S. PATENT DOCUMENTS 3,699,571 10/1972 Sanders ..................... 343/5 LS
4,126,859 11/1978 Böhm ........................ 343/5 LS
4,250,505  2/1981 Kirner ....................... 343/5 LS
4,358,763 11/1982 Strauch ................... 343/6.8 R X
4,513,447  4/1985 Carson .................... 343/6.8 R X Primary Examiner—Theodore M. Blum
Assistant Examiner—John B. Sotomayor
Attorney, Agent, or Firm—Robert J. Kraus

[57] ABSTRACT

An aircraft position determining system including an on-board radio altimeter which cooperates with a ground based transponder/beacon located at a position A. The radio altimeter is adapted as a distance meter and comprises means (9, 14, 15, 16) for shifting the frequency of the local oscillation signal. The system has a range sufficient to enable it to operate in a second predetermined volume defined with respect to the position A which includes a first volume defined by the lateral distance accuracy (d) and vertical distance accuracy (h) of the position determined by an independent on-board guidance device. The exact position of the aircraft when close to A is determined by at least two successive measurements of distance from to the position A.

6 Claims, 7 Drawing Figures

AIRCRAFT POSITION DETERMINING SYSTEM

BACKGROUND OF THE INVENTION

The invention relates to a terminal-guidance or position-adjustment system for aircraft, particularly reconnaissance missiles equipped with computing facilities. In such a system a radio altimeter installed aboard the ircraft cooperates with a transponder installed on the ground at site A intended for the return of the aircraft or for its position adjustment. The radio altimeter is of the continuous-wave type in which the carrier is frequency-modulated in an essentially linear manner, and includes a transmitting aerial and a receiving aerial directed towards the ground. The transponder is of the pseudocontinuous-wave type and includes two-position switches for controlling radio-frequencies and receiving/transmitting aerial connections.

The invention is intended preferably for an aircraft possessing an inertial centre or any other system giving a similar accuracy and adequate computing facilities. A system of the above-identified type is known from French Patent Specification 2,435,866 (corresponding to U.S. Pat. No. 4,358,763).

Aerial-reconnaissance missiles are generally designed for departing from a base, covering a certain predetermined route, carrying out observations above certain zones, and returning to a base which may be the base from which they departed or another base corresponding to the end of the route. These various operations are performed automatically by means, on the one hand, of an inertial guidance device which enables the missile to "know" at every instant during flight its horizontal accelerations, speed and position and, on the other hand, of a radio altimeter indicating the height above the ground. The horizontal path and the height are programmed in advance and an on-board computer enables the intended position of the missile to be compared at any instant with the position indicated by the inertial guidance device and to make progressively the steering corrections necessary to keep the missile as close as possible to the preset intended path.

The path covered by the missile is on the order of several hundreds of kilometers and, although its inertial guidance device is very accurate, its position error at the arrival area is on the order of several hundreds of meters. However, it is desired to recover the missile or at the very least the information it has gathered in the course of its mission and this position inaccuracy may prove inconvenient both with regard to the difficulty of locating exactly what has to be recovered and what may be parachuted on the return of the device, and for the area to be set aside for this landing. Generally speaking, the aforementioned disadvantages are accepted and no terminal-guidance system is provided for the missile which remains independent from the start to the finish of its flight.

SUMMARY OF THE INVENTION

An object of the invention is to provide a terminal-guidance or position-adjustment system for aircraft which is simple to embody and put into operation.

The disadvantages of the state of the art are overcome and the aim outlined above is achieved in accordance with the invention by adapting to radio altimeter for sequential operation as a distance meter. The radio altimeter incorporates to that end means for shifting the frequency of the local oscillation signal with the aid of a two-position switch. The system has a sufficient range to enable it to operate in a second predetermined volume defined with respect to point A. The second volume includes a first volume defined by the distance accuracy of the independent guidance device. The exact position of the aircraft in the vicinity of point A is determined, at the time of its return, by at least two successive measurements of distance D relative to point A. The basic idea of the invention is to utilize the radio altimeter already installed on the aircraft, by having it cooperate, in the vicinity of the point of return, with a transponder/beacon, which may be of a basically familiar type and preferably as described in the French Pat. No. 2 435 866, making it possible to obtain an adequate operating range without any risk of blotting-out of the receivers or hooking-on of the transponder to an unwanted echo of the retransmitted signal.

The presence in the local oscillation channel of a mixer which creates a frequency shift equal to the frequency shift applied to the signal in the transponder before its retransmission makes it possible to select the echo from the transponder while eliminating that from the ground. As it is not necessary for the radio altimeter to operate continuously, it is thus possible to use it as a distance meter in the vicinity of the point of arrival of the aircraft, the aim being that the aircraft should be able to itself to determine its position exactly in relation to point A at a given instant, after which the final procedure for arriving at point A can be performed automatically, e.g. by means of the inertial guidance device and on-board computing facilities. The use of the on-board distance meter and of the transponder at point A is no longer required after the passage of the aircraft over the reference point. It will be seen below that it is possible to determine the exact position of the aircraft purely by means of distance measurements, i.e. without any angle measurement, but that necessitates at least two distance measurements. The first two distance measurements, performed without any modification of the aircraft's path, make it possible to determine two possible points for the position of the aircraft but a problem of ambiguity arises, namely how to convey to the aircraft from what side it would approach point A following its independent path, i.e. if no correction were made to its path upon its arrival. Various embodiments of the invention are aimed either at resolving this ambiguity or at preventing its occurrence.

In a first embodiment, the terminal guidance system for the aircraft according to the invention is notable for the fact that after the second distance measured at a point B at an instant $t_2$, the aircraft receives an order to follow a loop path in a predetermined direction of rotation such that, after a measurable time, it returns virtually to the point B at which it was at instant $t_2$, at an instant $t_3$ with a speed vector which is essentially perpendicular to that which it had at instant $t_2$ and that a third distance measurement is performed at an instant $t_4$ just after instant $t_3$.

The third distance measurement makes it possible to remove the aforesaid ambiguity as determining whether the value found for this third measurement is lower or higher than the value found for the second measurement.

In a second embodiment, the terminal-guidance system for aircraft is notable for the fact that the distance measurements are performed in close succession without modification of the aircraft's independent path, including decreasing distances at least to the nearest point of passage to point A, and at least one distance $L_5$ increasing again, at a point F at instant $t_5$. This second form of embodiment itself generates several variants which are explained below.

BRIEF DESCRIPTION OF THE DRAWING

The description which follows, read in conjunction with the attached drawing figures, all given by way of example, will show how the invention can be implemented.

DESCRIPTION OF THE PREFERRED EMBODIMENTS

Figure 1:
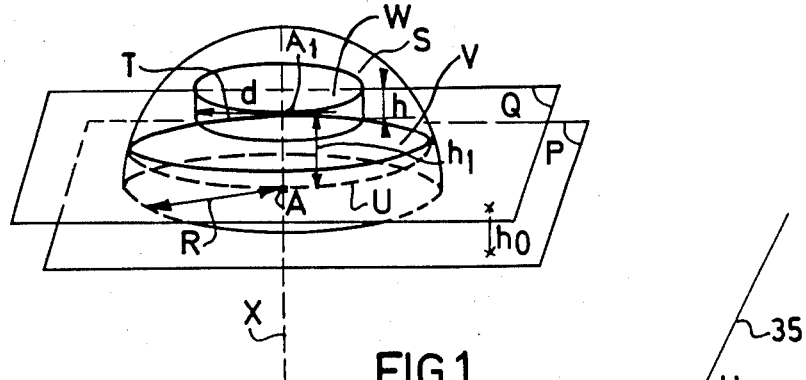
FIG. 1 shows a three-dimensional view of the volume in which the system according to the invention can operate, in the vicinity of the point of arrival.

In FIG. 1 the ground is symbolised by a plane P in which is located the point A intended for the arrival or the position adjustment of the aircraft and at which has been installed a transponder designed to receive and, after amplification, retransmit continuous frequency-modulated waves. A half-sphere S of center A and radius R indicates the range of the guidance system, R being the extreme distance beyond which the attenuation of the waves in the air exceeds the systems amplification capacity, distance D then ceasing to be measurable. In practice, when the aircraft arrives in the vicinity of point A, it is supposed to be at an altitude higher than a predetermined altitude $h_o$ which is smaller than R, i.e. above a surface symbolized by a plane Q in FIG. 1 located a distance $h_o$ above plane P. The intersection of the half-sphere S and plane Q is the circle T. Additionally, the directional pattern of the aerial of the transponder at point A is such that reception is possible above a curved surface of revolution, marked U, around point A and which can be likened, as a first approximation, either to a portion of a sphere or to a cone of apex A and passing through the circle T. The volume is delimited by the curved surface U and by the top spherical portion of the half-sphere S limited to the circle T is a volume of revolution V around a vertical axis X passing through point A, inside which the system according to the invention can operate, this volume V being called the second volume.

Furthermore, the aircraft (such as a reconnaissance missile) is designed to return to point A at a certain altitude $h_1$, which defines a point $A_1$ on the the axis X. In the absence of a terminal guidance system, the airborne inertial guidance device and radio altimeter will enable point $A_1$ to be reached with an accuracy d in the horizontal direction and an accuracy h in the vertical direction, thereby defining a first cylindrical volume W. The terminal guidance system is designed such that the second volume V entirely contains the first volume W and the distances $h_o$ and $h_1$ are preferably chosen to be equal. Under these conditions, the shortest range R of the system is necessarily greater than the distance d determined by the missile or aircraft.

Figure 2:
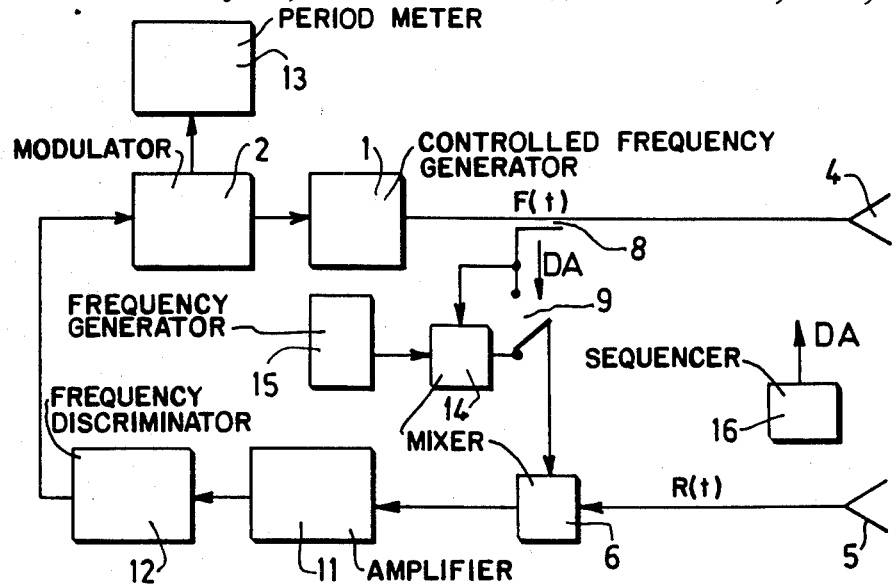
FIG. 2 is a block diagram of the radio altimeter adapted as a distance meter in accordance with the invention.

The radio altimeter used in the aircraft, shown in FIG. 2, is of a familiar type and similar, for example, to those described in the French Pat. No. 2 344 031 corresponding to U.S. Pat. No. 4,107,697). This radio altimeter essentially incorporates a controlled frequency generator 1 which, in response to an asymmetrical sawtooth voltage or current signal, e.g. with a positive-going slope, from a modulator 2 produces a linearly frequency-modulated signal. This last signal of frequency F(t) is applied to a circular-polarization transmitting aerial 4 which is attachment to the aircraft and directed towards the ground. The wave transmitted by aerial 4 is reflected by the ground and picked up by the receiving aerial 5. Aerial 5 is connected to a first input of a subtractive mixer 6. Mixer 6 also receives at a second input a fraction of the transmitted signal via a coupler 8 and a two-position switch 9 (operative at ultrahigh frequencies) when the switch is in the position opposite to that shown in FIG. 2. The variations of frequency of the waves transmitted and received as a function of the time F(t) and R(t) have the shape of asymmetrical sawtooth signals with a positive-going slope. These curves have the same shape as the modulation signal delivered by modulator 2. The modulation period is called T. The curves of the transmitted and received signals are shifted in relation to each other by the time: $\tau = 2H/c$, which corresponds to the propagation time of the wave from aerial 4 to aerial 5 via the ground, H being the mean distance from the aerials to the ground and c being the speed of propagation of the wave.

Mixer 6 forms the beat signal with frequency $f_b$ between the signal derived from the local oscillation and the received signal, and the beat frequency $f_b$ appears as the frequency shift between the slopes of the two sawtooth curves described above. The frequency variations represented by the two curves in question are practically linear and we may write:

$$\frac{\Delta F}{T} = \frac{f_b}{\tau} \tag{1}$$

$\Delta F$ being the frequency shift of the transmitted or received signal, which is known exactly and, for example, kept constant.

The output signal with frequency $f_b$ from the mixer 6 is applied via an amplifier 11 to a frequency discriminator 12 whose fixed center frequency is $f_o$ and which produces a signal E representing the frequency shift $f_b - f_o$. This signal is applied preferably via an integrating-/anamorphic circuit, not shown, to the control terminal of modulator 2 to modify the slope of the sawtooth modulation signal. There has thus been formed a servo loop whose error signal is formed by the output signal E from discriminator 12 and when when this loop is stabilized, the error signal is cancelled out and we have:

$$f_b = f_o.$$

The formula (1) above becomes:

$$\frac{\Delta F}{T} = \frac{f_o}{\tau} \qquad (2)$$

From this we deduce:

$$T = \frac{2\Delta F}{c \cdot F_o} \cdot H \qquad (3)$$

In expression (3), the factor $$\frac{2\Delta F}{c \cdot f_o}$$

is known and the modulation period T is thus proportional to the height H so that the distance measurement can be provided by a period meter 13 measuring the period T of the modulation signal.

Apart from the basic principle of the known radio altimeter recalled above, there also various known means for improving the linearity of the frequency slopes of the signal F(t) and the stability of the parameters $\Delta F$ and $f_o$, all these being directed at improving the precision of the height H measured.

Operation of the circuit in FIG. 2 as a radio altimeter presupposes that the elements 5 and 8 are each directly connected to an input of the mixer 6, a situation created when the switch 9 receives a signal $\overline{DA}$ from a sequencer 16.

According to the invention, switch 9 makes it possible to use the circuit in FIG. 2 as a distance meter, in combination with a transponder described below with reference to FIG. 3. To that end, when the aircraft enters volume V, the signal F(t) transmitted by aerial 4 is received by the transponder which amplifies it, shifts it in time by a fixed time interval $\tau'$, shifts it in frequency with a value $F_1$ and retransmits it in the form R(t). The amplification of the system is sufficient, within the volume V, to ensure that this signal R(t) is picked up by serial 5. The attenuated signal R(t) is then transmitted to the first input of mixer 6. Simultaneously, the local oscillation signal is transmitted via the coupler 8 from a frequency mixer 14 and switch 9 in the position shown in FIG. 2, under the control of signal DA, to the second input of mixer 6. Mixer 14, which may, for example, be of the single-sideband (SSB) type, receives via a second input from a frequency generator 15, a signal of frequency $F_1$ such that its output signal follows the same frequency variation as the signal R(t) from the transponder. The shifts of frequency $F_1$ at the two inputs of the subtractive mixer 6 are cancelled out at the output of this mixer. The shift of frequency $F_1$ performed on the two channels thus makes it possible to select the echo from the transponder and to eliminate that from the ground, which is also received by aerial 5 in its distance-meter mode. Discriminator 12 is then receiving a beat signal of frequency $f_{b1}$ which is representative of the distance D between the transponder at point A and the aircraft and this distance D can be measured by period meter 13 as described above for the altitude H. It will be noted in this case that the echo signal is delayed by a time $\tau'$ and that the formula which enables the distance to be determined is written:

$$f_{b1} = f_o = \left( \frac{2D}{c} + \tau' \right) \frac{\Delta F}{T} \qquad (4)$$

from which it can be deduced that:

$$T = \frac{2\Delta F}{c \cdot f_o} D + \frac{\tau' \Delta F}{f_o} \qquad (5)$$

No allowance has been made in formulae (4) and (5) for the Doppler effect, which is generally not negligible but which can be measured and dealt with in a known fashion.

There is thus obtained, as for the measurement of the altitude, a linear expression for the variables D and T, which means that it is easy to deduce the value of D by measuring T.

It is advisable, in connection with the invention, not to modify the aerial base of the radio altimeter when the latter is adapted for use as a distance meter, except that the two aerials must have sufficiently wide radiation patterns and that not only for reasons of simplicity and hence of economy. In fact, when the aircraft enters volume 5, it is not generally headed towards the axis X because of inaccuracy of the inertial guidance device which has been indicated above and that is precisely what the invention attempting to correct. In this circumstances, the transmitting aerial 4 directed towards the ground makes it possible, provided it has a sufficiently wide radiation pattern, to communicate with the transponder located at A with a fixed aerial gain whatever the horizontal angle of entry by the aircraft into volume V, the aerial of the transponder, for its part, having an omnidirectional, circular radiation pattern which is directed upwards. The advantage thus obtained of an aerial gain which is independent of the aircraft's orientation in a horizontal plane is counterbalanced by the fact that this aerial gain is low. That explains why it is necessary to use a transponder capable of giving a high gain. The transponder used for implementing the invention and described below with reference to FIG. 3 is known, with regard to its main features, particularly from the French Pat. No. 2 435 866, mentioned above.

Figure 3:
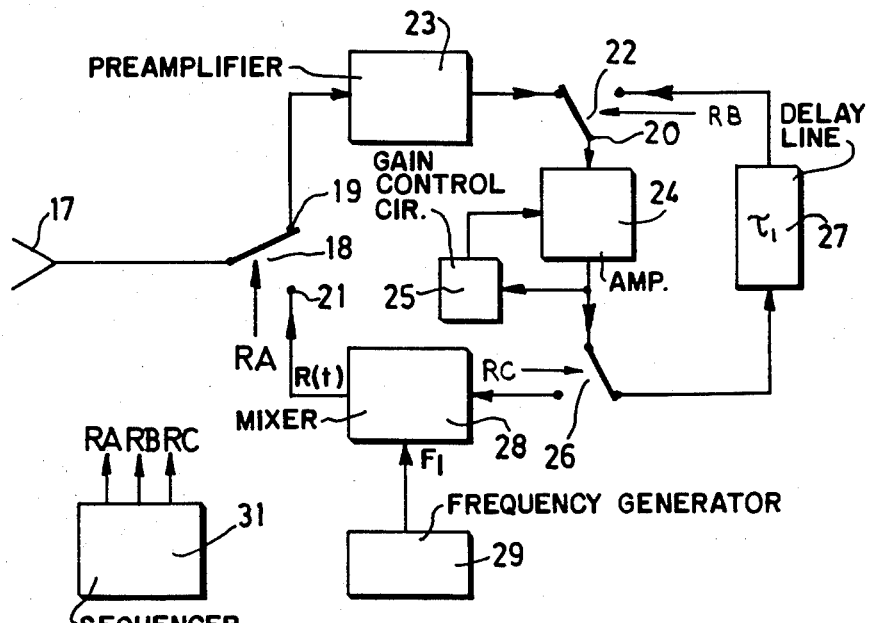
FIG. 3 is a block diagram of the transponder, the essential parts of which are familiar, but adapted for the application of the invention.

The transponder of FIG. 3 makes it possible to improve the decoupling between the received signal and the retransmitted signal and to obtain very high gains. A receiving/transmitting aerial 17 is connected to the middle terminal of a first two-position UHF switch 18 whose contacts 19 and 21 form the input and output terminals of the transponder. The input 19 is connected to a contact of a second two-position switch 22, preferably via a preamplifier 23 possessing a good signal-to-noise ratio. The presence of preamplifier 23 is not indispensable but is is desirable in so far as it enables the signal-to-noise ratio to be improved, in view of the fact that high gain is an objective. The middle terminal 20 of switch 22 is connected to the input of an amplifier 24 whose gain is regulated by gain-control circuit 25 which is looped back between the output of the amplifier and a control input. The output of amplifier 24 is connected to the middle terminal of a third two-position switch 26 whose contacts are respectively connected to the input of a delay line 27 and the input of a frequency mixer 28. The output from the delay line 27 is connected to the other contact of switch 22 and the output from mixer 28 to contact 21 of switch 18. Mixer 28, which may, for example, be of the single-sideband (SSB) type, receives at a second input, from a frequency generator 29, a signal of frequency $F_1$ such that this frequency is added to or subtracted from that of the input signal from switch 18. The output signal R(t) from mixer 28 and thus from the transponder-beacon located at point A is shifted in frequency in relation to the input signal of the transponder by the value $F_1$. As has been described above, the local oscillation signal in the airborne distance meter is shifted by the same value $F_1$ and in the same sense, i.e. by addition or subtraction of $F_1$, for comparison in the mixer 6 in FIG. 2 with the signal of frequency R(t) picked up by aerial 4.

The transponder in FIG. 3 is called a pseudo-continuous-wave transponder because it transforms a continuous-wave signal from the radio altimeter at its input 17 into a chopped output signal. The chopping of the signal does not constitute any disadvantage for the system provided that the chopping frequency accords with the sampling theorem in relation to the beat frequency $f_{b1}$ which is very close to the nominal frequency $f_o$ of the distance meter. In the case of the radio altimeter in FIG. 2, frequency $f_o$ is generally chosen lower than 100 kHz and typically equal to 25 kHz or 50 kHz. The operating frequency of switch 18, under the action of a control signal RA from a sequencer 31, has to be at least equal to twice the frequency $f_o$, i.e. for $f_o$ lower than or equal to 100 kHz, at least equal to 200 kHz. As an example of application, we choose a frequency of 400 kHz, i.e. a cycle time of 2.5 $\mu$s for switch 18.

Three phases may be distinguished for the operation of the transponder, namely a reception phase, an internal looping phase, called a recirculation phase, and a transmission phase. The reception phase is that shown in FIG. 3. For a time $\tau_1$ delay line 27 accumulates the signal received via aerial 17 and amplified via amplifiers 23 and 24, then switch 22 changes its position, marking the start of the recirculation phase which lasts a time also equal to $\tau_1$. During the recirculation phase the signal circulates in a loop via the elements 24 and 27, the gain provided by amplifier 24 being greater than the attenuation due to delay line 27. During the circulation phase switch 18 can occupy any position under the control of the signal RA. At the end of the second consecutive time interval of duration $\tau_1$, switch 26, in its turn, changes its position as also does switch 18 if this has not already happened in the preceding phase, thus marking the start of the transmission phase of duration $\tau_1$, during which the positions of the contacts of switches 18, 22 and 26 are the opposite of those shown in the figure. The signal is thus transmitted during a time $\tau_1$ after having been delayed for a time $\tau' = 2\tau_1$, i.e. a maximum cyclic ratio of one-third, and after having been amplified once by preamplifier 23 and three times by amplifier 24. In practice, it has to be ensured that the signal transmitted by the transponder and returning after reflection from an obstacle is sufficiently attenuated for there to be no risk of pick-up. Given the gain of the transponder, which may be greater than 100 dB, it has to be ensured that the time elapsing between the start of a transmission and the start of the next reception is great enough to ensure that the risk of pick-up referred to above is physically impossible because the obstacle causing the echo would have to be too near and too large. By allowing a latency time of the order of 1 $\mu$s between the end of a transmission and the start of the next reception, it can be shown that all risk of pick-up is eliminated for a signal whose carrier has a wavelength of the order of 10 cm, which corresponds to the ultra-high frequencies normally used for the system described. This latency time is represented in FIG. 3 by the maintenance in the transmission position of the three switches before their simultaneous return to the reception position. For example, the duration $\tau_1$ is equal to 0.5 $\mu$s, which gives a cycle time of 2.5 $\mu$s for switch 18 and a cyclic ratio of 0.2 for the transponder, this cyclic ratio of the order of 0.2 is reflected in an equivalent attenuation of only several decibels on the signal retransmitted by the transponder. The operation of switches 18, 22 and 26 so as to obtain the sequences described above is carried out under the control of the signals RA, RB and RC transmitted by the sequencer 31.

It will be noted that another mode of operation is possible for the transponder in FIG. 3, whereby the circulation phase is eliminated. In this case, the signal passes through delay line 27 and amplifier 24 twice, and the cyclical ratio becomes equal to 0.25. For this simplified operation the three switches operate in synchronism, under the control of the signal RA which is then identical to signals RB and RC.

During the flight of the aircraft, or the reconnaissance mission of the missile, the circuit in FIG. 2 is used exclusively as a radio altimeter controlled by the signal $\overline{DA}$. When the aircraft or the missile arrives within the vicinity of point A at which the beacon in FIG. 3 is located or, more exactly, starting from a distance at least equal to: R+2d, indicated by the inertial guidance device, the circuit in FIG. 2 is controlled by sequencer 16 so as to alternately perform measurements of distance D and measurements of altitude H. The on-board computing facilities enable the distance L of the aircraft from axis X to be deduced in accordance with the formula:

$$L = \sqrt{D^2 - H^2} \qquad (6)$$

According to the invention, at least two first determinations, at close intervals, of the distance L by measurement of D and H, then by calculation, are performed on board the aircraft inside the circle T without any modification of the independent path of the aircraft. In this connection reference may be made to FIG. 4 which is a view from above of the arrival zone of the aircraft over which the circle T and the point A are shown. The first distance determined, $L_1$ at instant $t_1$, enables the aircraft to detect for itself its position on a circle $T_1$ of centre $A_1$ and radius $L_1$. Similarly, the second distance $L_2$ at instant $t_2$ enables the aircraft to pinpoint itself on a circle $T_2$, smaller than $T_1$, with centre $A_1$ and radius $L_2$. Additionally, because of its inertial guidance device and an on-board compass, the aircraft knows its horizontal speed vector v at any instant. At time $t_2$ the aircraft is also on the circle $T_3$ with centre O and radius $L_1$ obtained by translation of the circle $T_1$ in accordance with the vector:

$$\vec{AO} = \int_{t_1}^{t_2}$$

$\vec{v}(t)dt$; for instants $t_1$ and $t_2$ in close proximity, as a first approximation: $\vec{AO} = \vec{v}(t_2 - t_1)$. The circles $T_2$ and $T_3$ intersect each other at two points B and B'. At instant $t_2$ the aircraft is therefore at one of the two points B and B'. The positions of points B and B' can be calculated accurately and rapidly, in a known fashion, by the onboard computing facilities. It still remains necessary, however, to remove the ambiguity as to the position of the aircraft caused by the existence of two possible points. For this, several solutions are possible.

Figure 4:
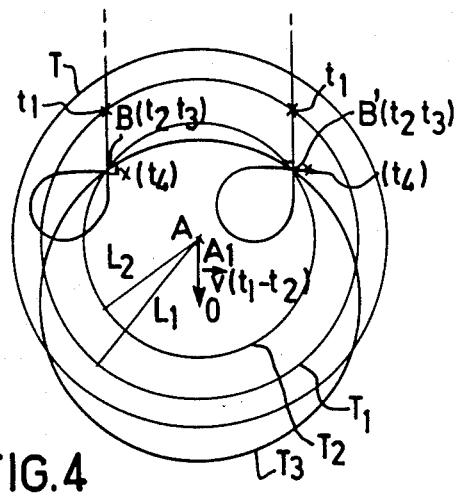
FIGS. 4, 5 and 6 respectfully illustrate the operation of first, second and third embodiments of the guidance system according to the invention.

In a first form of embodiment shown in FIG. 4, the aircraft receives, immediately after instant $t_2$, a command to follow a loop path in a predetermined direction of rotation, e.g. to the right, so that after a measurable time it again passes virtually through point B (or B') at an instant $t_3$ with a speed vector $v'$ which is essentially perpendicular to that which it had at instant $t_2$. This maneuver of the aircraft can be performed automatically in a known fashion by cooperation between the aircraft's steering facilities and its inertial guidance device. Immediately after instant $t_3$, a third distance measurement $L_3$ is performed at instant $t_4$. In the case of a preliminary turn to the right, if the value of $L_3$ is greater than that of $L_2$, the computing facilities indicate that the aircraft is, within $T_4$, in the immediate vicinity of point B' or, if $L_3$ is smaller than $L_2$, that the aircraft is in the immediate vicinity of B, with the speed vector $\vec{v}'$ in both cases. The deduction is the opposite for a preliminary turn to the left. Immediately after instant $t_3$, therefore, the aircraft knows its exact position in relation to point A or A' and also its speed vector. From then on, the final guidance or position-adjustment phase can be carried out in a known fashion in order to reach A or point A' either by means of the inertial guidance device, whose position error has just been corrected, or by means of the actual terminal-guidance system formed by the radio altimeter/distance meter and the beacon/transponder in FIGS. 2 and 3.

Figure 5:
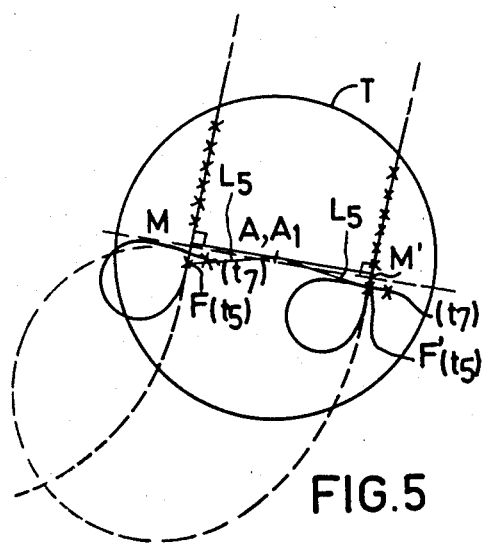

In a second form of implementation shown in FIG. 5 fairly close values of L are determined without any modification of the aircraft's path, starting from the moment at which the radio altimeter in FIG. 2 is authorized to operate as a distance meter and at which the aircraft is sufficiently close to point A for the interrogator/transponder system to operate, i.e. essentially as soon as the aircraft has crossed the limits of circle T. The curve L(t) representing the distance L thus obtained as a function of time, not shown, first decreases, then passes through a minimum at the moment at which the aircraft passes nearest to the axis X, at a point M or M'. The perpendicular at this point M to the independent path of the aircraft passes through axis X at or very near to point $A_1$. Point M or M' can also be determined with a very small error if it is made identical with the first point F or F' at instant $t_5$ for which the curve of the distances L starts increasing, the accuracy obtained being greater as the successive measurements of L are made closer to one another, at least in the vicinity of the minimum of the curve L(t). Immediately after instant $t_5$ the aircraft is given an automatic control signal such as that already described with reference to FIG. 4. Immediately after having completed a loop in a predetermined direction and having returned virtually exactly to point F at an instant $t_6$, a further determination of the distance L, at an instant $t_7$, makes it possible to remove the ambiguity pointed out above as to the position of the aircraft and to indicate to it from which side, right or left, it should approach the axis X. An advantage of this embodiment is that at instant $t_7$ the speed vector of the aircraft is based on a straight line passing more or less exactly through the axis X. Depending on the particular case, the direction of the speed vector has to be either maintained or reversed, i.e. changed by 180°. It will be noted that the loops which the aircraft's path executes on FIGS. 4 and 5 are carried out exclusively and integrally under the control of the inertial guidance device, that they can be executed on a scale much larger than that shown with the continuous line and, in particular, be located for the most part outside the circle T.

Alternatively, the second embodiment of the invention described in the preceding paragraph may be simplified as shown by the broken line in FIG. 5; a path following a sufficiently large loop is provided for the aircraft. In fact, if it is arranged that, immediately after its distance in relation to point A has passed through a minimum, the aircraft describes an essentially horizontal loop upon an internal command and returns to the point of minimum distance (point M or M' in FIG. 5) perpendicularly to the path it was following on its first passage through this point, the aircraft will certainly pass in the immediate vicinity of point $A_1$, straight above or below point A provided the loop performed is large enough, i.e. to make matters clearer, provided its perimeter is at least of the same order of magnitude as the circumference of circle T. Depending on whether the axis X defined by points A and $A_1$ is initially approached from the right or from the left, passage within the immediate vicinity of point $A_1$ will, under these conditions, occur just before or just after the end of the loop. An additional measurement of distance D upon the aircraft's return to the second volume will then suffice to recreate the case, previously described, of the aircraft's passage through point M in the preceding paragraph since the effect of enlarging the loop path on the occasion of this additional measure is to obtain an aircraft speed vector which is always directed towards axis X, whether the aircraft has previously passed through point M or through point M'. For example, in order that the point of passage very near point $A_1$ should be determined with good accuracy, alternate measurements at close intervals of D and H can be performed by the system at least during the second half of the loop path in the case of previous passage through M' (see FIG. 5) and beyond that second half in the case of previous passage through M.

Figure 6:
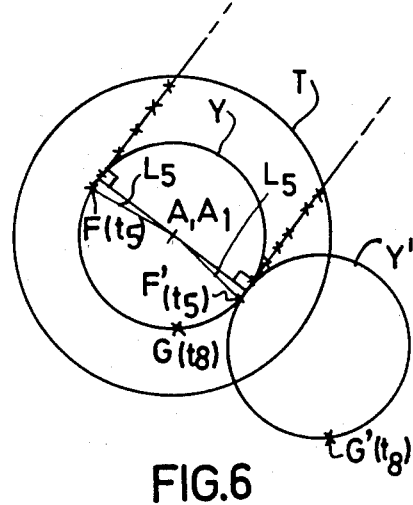

FIG. 6 shows a third embodiment of the invention in which the first phase is identical with that of the embodiment just described (FIG. 5) up to the arrival at point F at instant $t_5$. Immediately after instant $t_5$, the aircraft receives an order to follow a circular path in a predetermined direction or rotation e.g. to the left, the circle Y or Y' in question having a radius of curvature equal to $L_5$, which is made possible by knowledge of the speed vector tangential to point F or F'. After the aircraft has covered a considerable proportion of the circular path, a new distance measurement is carried out, at a point G or G' at an instant $t_8$, making it possible to determine on which of the two circles Y and Y' the aircraft is located. In fact, location on circle Y' is indicated by a distance considerably greater than $L_5$ whereas location on circle Y is indicated by a distance nearly equal to $L_5$. It will be noted that point G' may be outside the range of the transponder. In that case the location of the aircraft on circle Y' may be indicated by the impossibility of determining the distance. However, it is preferable for reasons of reliability of the system to avoid this last situation, which is always possible by choosing points G and G' sufficiently near points F and F'. When it is determined that the aircraft is located on circle Y', its landing procedure may consist in continuing its path on circle Y' until it returns to point F', where it has sufficient position and speed information to reach point A or A₁ as the case may be. When it is determined that the aircraft is on circle Y, the aircraft immediately possesses sufficient position and speed information to allow it to reach point A or A₁ since, as on its second passage through point F' in the preceding case, it knows its speed and its distance to axis X and its speed vector is perpendicular to the plane defined by axis X and the aircraft. It will be noted that the ambiguity which has to be resolved in order to allow the aircraft to reach axis X consists precisely in enabling the aircraft to determine, using its own measurements, from what side it will approach axis X on its arrival. This consideration leads to a fourth embodiment described below with reference to FIG. 7.

The fourth embodiment imposes a condition with regard to the relative values of d and R, which takes the form:

$$R > 2d \tag{7}$$

whereas the forms of embodiments described above with reference to FIGS. 4, 5 and 6 are satisfied with values of R and of d which are of the same order, R nevertheless always remaining greater than d. It may thus prove necessary to increase the range of the guidance system in order to put into operation the embodiment shown in FIG. 7. This can be achieved in particular by increasing the wavelength λ, i.e. by reducing the frequency of the signal of frequency F(t). In fact the value of the attenuation A between the aircraft is given by the formula:

$$\frac{1}{A} = \frac{G_e = G_r \lambda^2}{(4\pi)^2 \cdot D^2} + C \tag{8}$$

where:
- $G_e$ = the gain of aerial 4 of the distance meter in the direction of the transponder;
- $G_r$ = the gain of aerial 17 of the transponder in the direction of the aircraft;
- $C$ = the attenuation of the cables.

Figure 7:
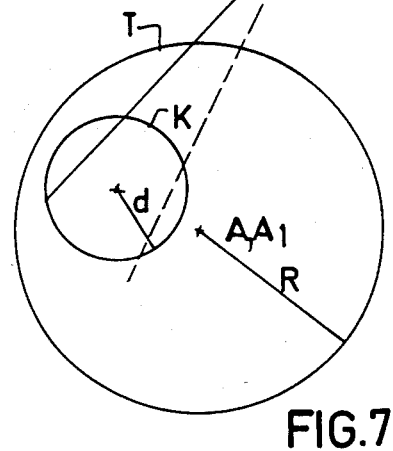
FIG. 7 illustrates the operation of a fourth embodiment of the guidance system according to the invention; this form is partly compatible with the first three forms of implementation.

The basic idea underlying the fourth embodiment is that when the aircraft, upon its return, arrives at a predetermined distance from A according to its own reckoning, this distance being greater than or equal to R+2d, it receives automatically and independently an order to change its path which causes it to arrive from a predetermined side of point A, in FIG. 7, at a predetermined distance between d and R/2. The relation (7) above ensures that the aircraft does in face enter circle T. In FIG. 7 curve 35 consisting of a broken line with two segments intersecting each other at a point H outside circle T indicates the independent path of the aircraft; circle K of radius d marks off the zone in which the aircraft would be capable of landing without the aid of the guidance system. By means of the conditions and constraints explained above, it is assured that the aircraft will get inside circle T by arriving at axis X from a predetermined side (from the right in the case of FIG. 7). It is then possible, using at least the start of the procedure adopted for the preceding embodiments, to determine the point B or F, or alternatively B' or F' at the instant $t_4$ or $t_5$ starting from which the final maneuver which must guide the aircraft to the axis X becomes immediately possible in a known fashion, under the control either of the intertial guidance device or of the terminal-guidance system according to the invention, the latter being preferred in the case where the aircraft is a helicopter.

The system described above allows a detection range R on the order of a km for a wavelength λ on the order of 7 cm and for a product of the aerial gains $G_e \times G_r$ on the order of 1. By comparison, current values of the position error d of the aircraft are on the order of 400 m. The special arrangements, already described, of aerials 4 and 17 means that a considerable dissipation of the total gain of the interrogator/transponder system can be expected if no precaution is taken, which might cause saturation at certain points of the system when the aerials are too close, during the distance measurement. To overcome this disadvantage, aerial 17 of the transponder is a circular-polarization aerial whose radiation pattern is preferably cosecant-squared and whose gain is under 0 dB below the horizontal. Normalization of the aerial gains is obtained as a first approximation by giving aerial 17 the cosecant-squared gain G:

$$G = \frac{D^2}{H^2} \tag{9}$$

or:

$$G = \frac{1}{1 - \cos^2\beta} \tag{10}$$

where β is the angle in a vertical plane at which the aircraft is seen from the transponder at point A. Aerial 17 of the transponder may be either a circular-polarization aerial or made up of two elementary linear-polarization aerials which are perpendicular to one another.

It will be noted that it is possible to modify the structure of the aerial system in the radio altimeter in FIG. 2 slightly to obtain a distance-measuring device operating with a single transmitting/receiving aerial formed by aerial 4 or aerial 5; this is made possible by the fact that the transponder is never very close and, moreover, that the transponder necessarily delays by a short time interval τ' the signal which is retransmits. To that end it is sufficient to insert, in generally known fashion, a circulator in either the transmission or reception channel, and in the other channel, a two-position switch, operated in synchronism with switch 9, one contact of which is connected to the circulator and the other contact to the aerial which is not connected to the circulator. In this case only the transmitting/receiving aerial used for the distance-measuring equipment need have a wide radiation pattern.

What is claimed is:

1. A method for utilizing a radio altimeter and an inertial guidance device aboard an aircraft for determining the position of the aircraft relative to a ground-based transponder, said method comprising the steps of:

(a) at a time $t_1$ transmitting a signal from the radio altimeter and measuring the times of returns of an echo signal from the ground and a distinctive return signal from the transponder to determine the altitude of the aircraft and its line of sight distance from the transponder, respectively, and determining therefrom the aircraft's horizontal distance $L_1$ from the transponder, said horizontal distance corresponding to the radius of a circle $T_1$ on which the aircraft lies at time $t_1$;

(b) at a time $t_2$ repeating step (a) to determine the aircraft's horizontal distance $L_2$ from the transponder, said horizontal distance corresponding to the radius of a circle $T_2$ on which the aircraft lies at time $t_2$;

(c) determining first and second intercepts of circle $T_2$ with a circle $T_3$ having a radius $L_2$ and having a center shifted in the direction of travel of the aircraft by the distance $v(t_1-t_2)$, where v is the velocity of the aircraft, one of said intercepts corresponding to the position of the aircraft at time $t_2$;

(d) maneuvering the aircraft such that it returns at a time $t_3$ to the position occupied thereby at time $t_2$, but on a course perpendicular to its course at time $t_2$; and (e) immediately after time $t_3$, repeating step (a) to determine the aircraft's horizontal distance $L_3$ from the transponder and determining whether $L_2$ or $L_3$ is larger, thereby determining whether the aircraft is proximate the first or second intercept.

2. A method for utilizing a radio altimeter and an inertial guidance device aboard an aircraft for determining the position of the aircraft relative to a ground-based transponder, said method comprising the steps of:

(a) as the aircraft, traveling on a first course, nears and passes its closest point of approach to the transponder, transmitting a signal from the radio altimeter and measuring the times of returns of echo signals from the ground and distinctive return signals from the transponder to repeatedly determine the altitude of the aircraft and its line-of-sight distance from the transponder, respectively, and determining therefrom the aircraft's horizontal distance from the transponder as a function of time $L(t)$, the minimum of said function representing said horizontal distance at the closest point of approach and defining first and second points on a horizontal axis passing through the transponder site and intersecting the path of the aircraft in a direction perpendicular to the first course of the aircraft, each of said points being at a horizontal distance $L_5$ from the transponder site but on opposite sides of said transponder site;

(b) mameuvering the aircraft such that it returns to the closest point of approach, but on a second course perpendicular to the first course and substantially parallel to the axis passing through the transponder site; and (c) immediately after the return to the closest point of approach, determining the aircraft's horizontal distance $L_7$ from the transponder site as in step (a), the relative magnitude of $L_7$ with respect to $L_5$ indicating whether the aircraft is heading toward or away from the transponder site and thereby indicating whether the aircraft is proximate the first or second point.

3. A method for utilizing a radio altimeter and inertial guidance device aboard an aircraft for determining the position of the aircraft relative to a ground-based transponder, said method comprising the steps of:

(a) as the aircraft, traveling on a first course, nears and passes its closest point of approach to the transponder, transmitting a signal from the radio altimeter and measuring the times of returns of echo signals from the ground and distinctive return signals from the transponder to repeatedly determine the altitude of the aircraft and its line-of-sight distance from the transponder, respectively, and determining therefrom the aircraft's horizontal distance from the transponder as a function of time $L(t)$, the minimum of said function representing said horizontal distance at the closest point of approach and defining first and second points on a horizontal axis passing through the transponder site and intersecting the path of the aircraft in a direction perpendicular to the first course of the aircraft, each of said points being at a horizontal distance $L_5$ from the transponder site but on opposite sides of said transponder site;

(b) maneuvering the aircraft such that it returns to the axis and follows a course along said axis toward the closest point of approach occurring in step (a), said return to the axis being at a distance from said closest point of approach which is larger than the distance between the first and second points; and (c) determining aircraft's horizontal distance from the transponder site as in step (a), the direction of said transponder site being the same as the course of the aircraft.

4. A method for utilizing a radio altimeter and an inertial guidance device aboard an aircraft for determining the position of the aircraft relative to a ground-based transponder, said method comprising the steps of:

(a) as the aircraft, traveling on a first course, nears and passes its closest point of approach to the transponder, transmitting a signal from the radio altimeter and measuring the times of returns of echo signals from the ground and distinctive return signals from the transponder to repeatedly determine the altitude of the aircraft and its line-of-sight distance from the transponder, respectively, and determining therefrom the aircraft's horizontal distance from the transponder as a function of time $L(t)$, the minimum of said function representing said horizontal distance at the closest point of approach and defining first and second points on a horizontal axis passing through the transponder site and intersecting the path of the aircraft in a direction perpendicular to the first course of the aircraft, each of said points being at a horizontal distance $L_5$ from the transponder site but on opposite sides of said transponder site;

(b) immediately after crossing the axis, maneuvering the aircraft such that it follows a circular path having a radius substantially equal to $L_5$; and (c) before completing the circular path, determining the aircraft's horizontal distance $L_8$ from the transponder site as in step (a), the relative magnitude of $L_8$ with respect to $L_5$ indicated the direction of the transponder site from either intersection of the circular path with the axis.

5. A method for utilizing a radio altimeter and an inertial guidance device aboard an aircraft for determining the position of the aircraft relative to a ground-based transponder, said method comprising the steps of:

(a) maneuvering the aircraft to approach the transponder site on a predetermined side of said site;

(b) at a time $t_1$ transmitting a signal from the radio altimeter and measuring the times of returns of an echo signal from the ground and a distinctive return signal from the transponder to determine the altitude of the aircraft and its line of sight distance from the transponder, respectively, and determining therefrom the aircraft's horizontal distance $L_1$ from the transponder, said horizontal distance corresponding to the radius of a circle $T_1$ on which the aircraft lies at time $t_1$;

(c) at a time $t_2$ repeating step (a) to determine the aircraft's horizontal distance $L_2$ from the transponder, said horizontal distance corresponding to the radius of a circle $T_2$ on which the aircraft lies at time $t_2$; and (d) determining first and second intercepts of circle $T_2$ with a circle $T_3$ having a radius $L_2$ and having a center shifted in the direction of travel of the aircraft by the distance $v(t_1-t_2)$, where v is the velocity of the aircraft, the intercept on the side of the transponder site on which the aircraft is approaching corresponding to the position of the aircraft at time $t_2$.

6. A method for utilizing a radio altimeter and an inertial guidance device aboard an aircraft for determining the position of the aircraft relative to a ground-based transponder, said method comprising the steps of:

(a) maneuvering the aircraft to approach the transponder site on a predetermined side of said site; and (b) as the aircraft, traveling on a first course, nears and passes its closest point of approach to the transponder, transmitting a signal from the radio altimeter and measuring the times of returns of echo signals from the ground and distinctive return signals from the transponder to repeatedly determine the altitude of the aircraft and its line-of-sight distance from the transponder, respectively, and determining therefrom the aircraft's horizontal distance from the transponder as a function of time $L(t)$, the minimum of said function representing said horizontal distance at the closest point of approach and defining first and second points on a horizontal axis passing through the transponder site and intersecting the path of the aircraft in a direction perpendicular to the first course of the aircraft, each of said points being at a horizontal distance $L_5$ from the transponder site but on opposite sides of said transponder site, the point on the side of the transponder site on which the aircraft is approaching corresponding to the position of the aircraft at its closest point of approach.

* * * * *